United States Patent
Mesfin et al.

(10) Patent No.: US 7,961,461 B2
(45) Date of Patent: Jun. 14, 2011

(54) SECURE MEDIA BAY AND MEDIA MODULE

(75) Inventors: Teodros Mesfin, Houston, TX (US);
David Gary Methven, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 12/554,424

(22) Filed: Sep. 4, 2009

(65) Prior Publication Data

US 2011/0058331 A1 Mar. 10, 2011

(51) Int. Cl.
*G06F 1/16* (2006.01)
(52) U.S. Cl. ......................... 361/679.57; 70/14; 312/237
(58) Field of Classification Search ............ 361/679.57; 70/14, 423; 312/237
See application file for complete search history.

(56) References Cited

U.S. PATENT DOCUMENTS

| | | | | |
|---|---|---|---|---|
| 5,483,419 A | * | 1/1996 | Kaczeus et al. | 361/679.39 |
| 5,622,064 A | * | 4/1997 | Gluskoter et al. | 70/14 |
| 5,687,592 A | * | 11/1997 | Penniman et al. | 70/14 |
| 5,691,879 A | * | 11/1997 | Lopez et al. | 361/679.57 |
| 5,757,616 A | * | 5/1998 | May et al. | 361/679.57 |
| 6,049,451 A | * | 4/2000 | Schmitt et al. | 361/679.33 |
| 6,246,572 B1 | * | 6/2001 | Myers et al. | 361/679.57 |
| 6,295,204 B1 | * | 9/2001 | Gibbons et al. | 361/726 |
| 6,494,070 B1 | * | 12/2002 | Moss et al. | 70/423 |
| 6,882,540 B2 | * | 4/2005 | Conn et al. | 361/752 |
| 6,915,065 B2 | * | 7/2005 | Lee | 386/360 |
| 6,927,968 B2 | * | 8/2005 | Pols Sandhu et al. | 361/679.57 |
| 7,054,144 B2 | * | 5/2006 | Heistand et al. | 361/679.57 |
| 7,133,290 B2 | * | 11/2006 | Junkins et al. | 361/726 |
| 7,140,904 B2 | * | 11/2006 | Carr et al. | 439/372 |
| 7,602,605 B2 | * | 10/2009 | Su et al. | 361/679.57 |
| 2005/0111180 A1 | * | 5/2005 | Song | 361/685 |
| 2005/0185370 A1 | * | 8/2005 | Chung | 361/683 |
| 2006/0203434 A1 | * | 9/2006 | Calloway et al. | 361/679 |
| 2007/0121285 A1 | * | 5/2007 | Liang et al. | 361/685 |

* cited by examiner

*Primary Examiner* — Lisa Lea-Edmonds
(74) *Attorney, Agent, or Firm* — Hayes and Boone, LLP

(57) ABSTRACT

A media apparatus includes a media bay having a media module slot. A security port is provided in the media bay adjacent the media module slot. A security fastener is provided in the media bay and is accessible via the security port. A security bar is movable between a first position wherein a first portion of the security bar opens the security port and exposes the security fastener, and a second position wherein the first portion closes the security port and conceals the security fastener. A lock plunger port is provided in the media bay adjacent a second portion of the security bar.

21 Claims, 5 Drawing Sheets

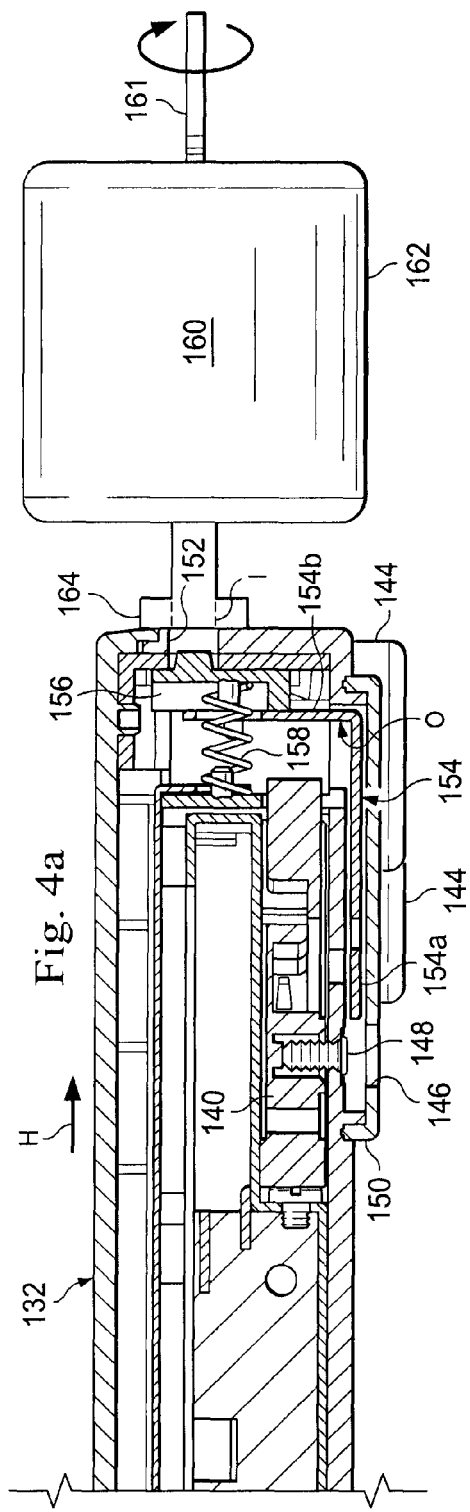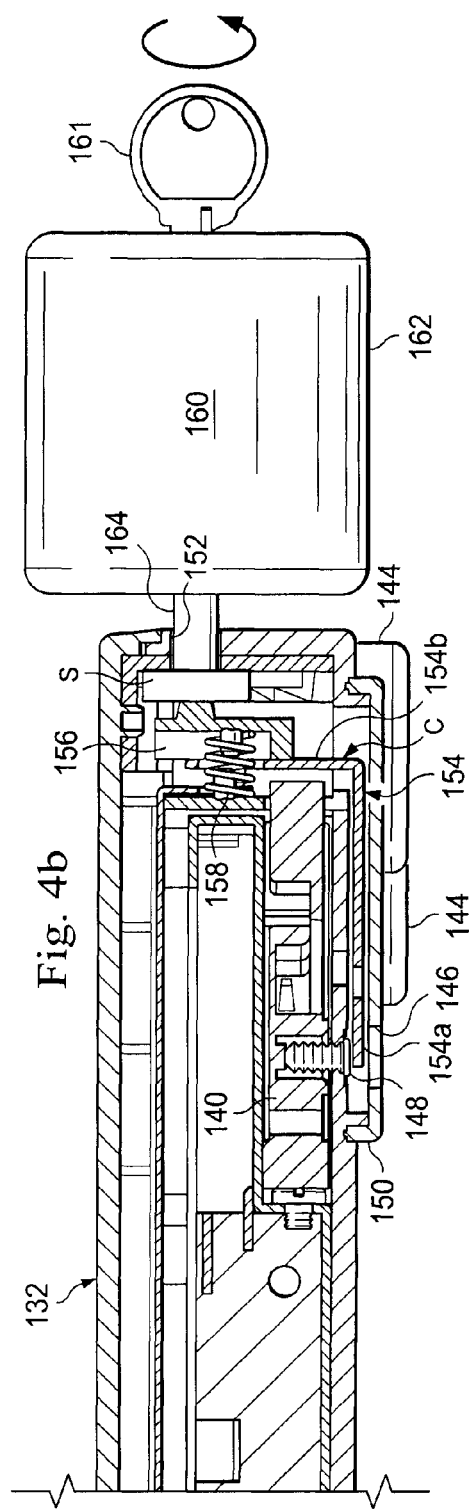

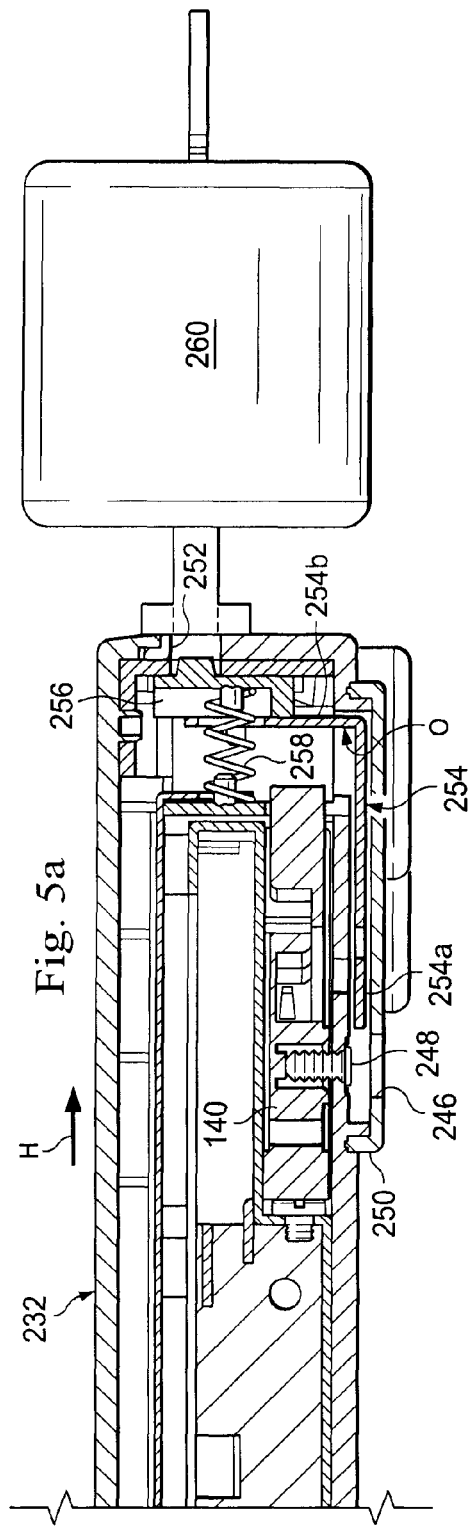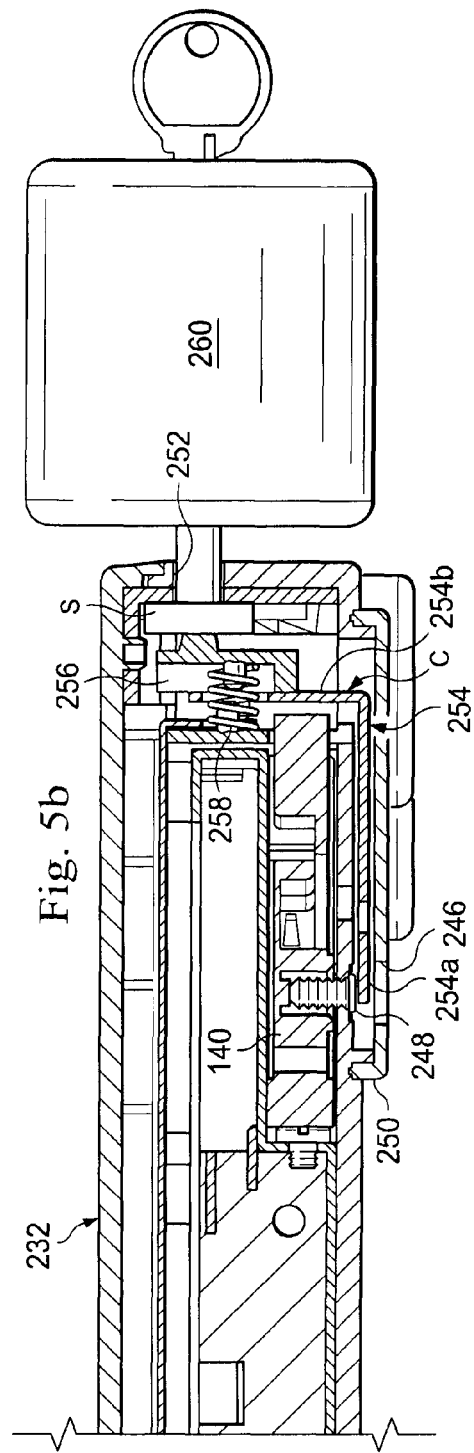

SECURE MEDIA BAY AND MEDIA MODULE

BACKGROUND

The present disclosure relates generally to an information handling systems, and more particularly to a media module secured in a media bay for use with an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Securing a mass storage device such as a media module in an external media bay is necessary to limit data theft from mass storage devices such as hard discs, DVDs, magneto-optical discs, optical discs and solid state storage devices. In the case of an external media bay, e.g. a second hard disc, both the media bay and media module must be secured by an uncomplicated but effective means.

Accordingly, it would be desirable to provide an improved media module secured in a media bay absent the disadvantages discussed above.

SUMMARY

According to one embodiment, a media apparatus includes a media bay having a media module slot. A security port is provided in the media bay adjacent the media module slot. A security fastener is provided in the media bay and is accessible via the security port. A security bar is movable between a first position wherein a first portion of the security bar opens the security port and exposes the security fastener, and a second position wherein the first portion closes the security port and conceals the security fastener. A lock plunger port is provided in the media bay adjacent a second portion of the security bar.

BRIEF DESCRIPTION OF THE DRAWINGS

FIGS. 4a and 4b are partial cross-sectional views illustrating an embodiment of the unlocked and locked positions, respectively, of a security bar.

FIGS. 5a and 5b are partial cross-sectional views illustrating an embodiment of the security bar in a laptop computer.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
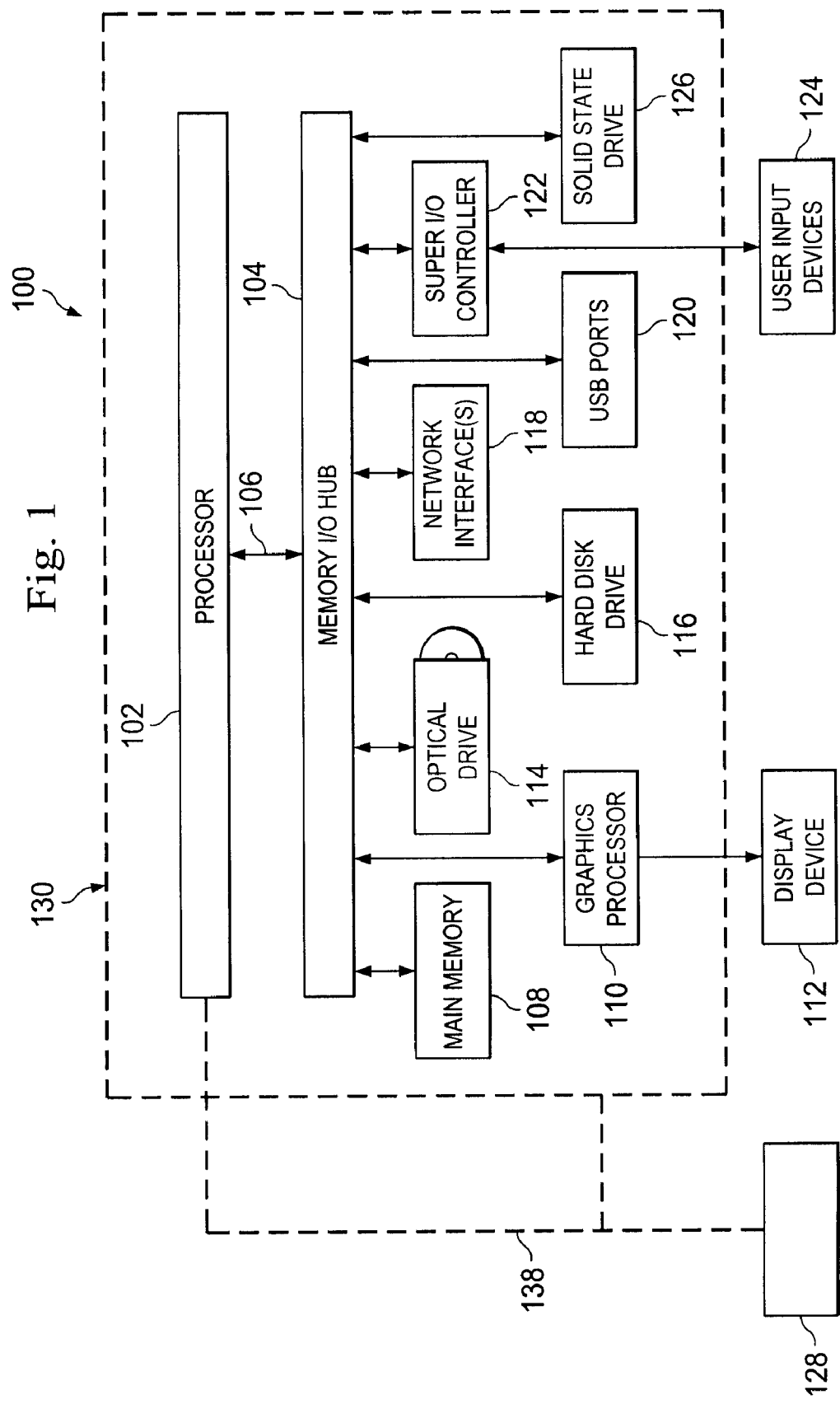
FIG. 1 is a diagrammatic view illustrating an embodiment of an IHS.

FIG. 1 is a block diagram of an IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116 and 126 may be located locally with the IHS 100, located remotely from the IHS 100, and/or they may be virtual with respect to the IHS 100. Portions of the system 100 are provided in an IHS chassis 130, FIG. 1. Other parts of the system 100 such as display 112 and input devices 124, such as a mouse and a keyboard for example are peripherally attached to the system 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

In the case of a laptop computer in a chassis 130 where a supplemental or second hard disc is needed, a media apparatus 128 comprising an external media module in a media bay may be coupled to the IHS 100.

Figure 2:
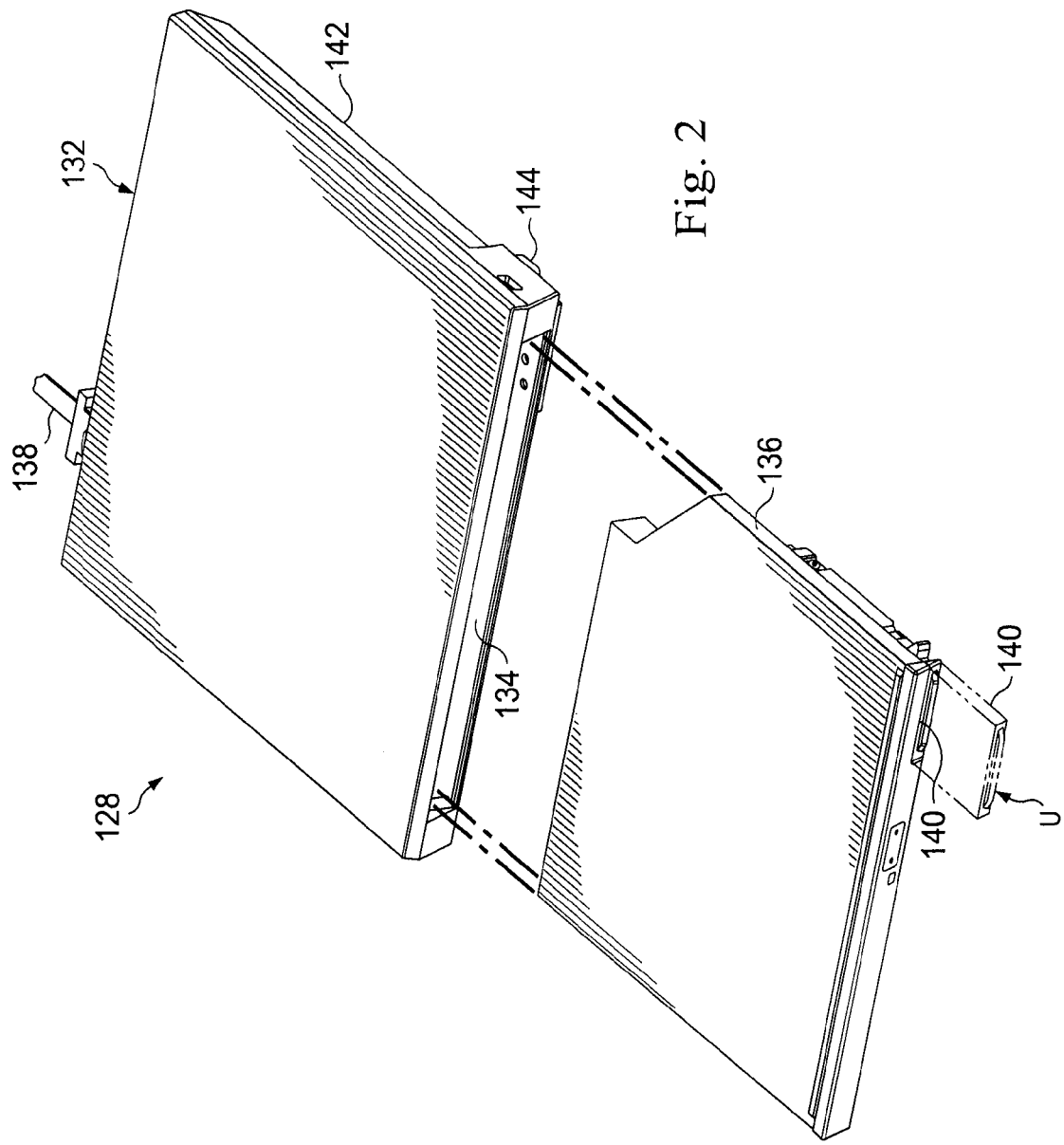
FIG. 2 is a perspective view illustrating an embodiment of a media bay and media module.

Media apparatus 128, FIG. 2, includes a media bay 132 having a media slot 134 for receiving a media module 136. The media apparatus 128 may be external to and coupled to a laptop computer via a cable 138. A module latch 140 on the media module 136 engages the media-bay 132 for removably retaining the module 136 in the slot 134. The module latch 140 is resiliently mounted to be manually actuated to extend from a lock position L in the module 136 to an unlock position U, extending from the module 136, when it is desired to remove module 136 from the bay 132. A seating surface 142 of media bay 132 includes a plurality of support feet 144.

Figure 3:
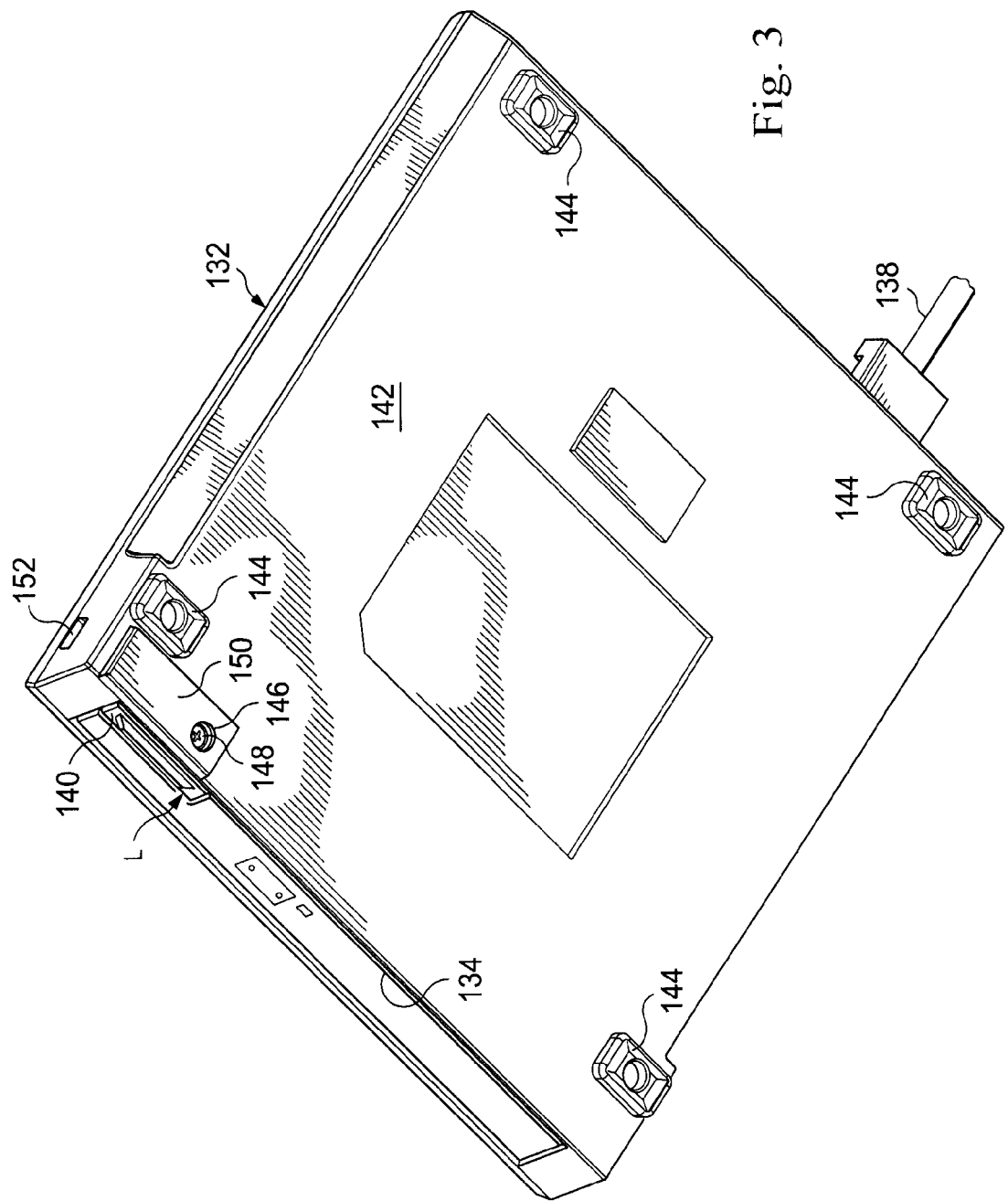
FIG. 3 is a perspective view illustrating an underside of the media bay.

Referring to FIG. 3, the seating surface 142 is illustrated including a plurality of support feet 144. Module 136 is mounted in slot 134 of bay 132 and latch 140 is retracted to the lock position L. A security port 146 is provided in bay 132 adjacent slot 134. A security fastener 148, such as a threaded fastener, is mounted in the bay 132 and is accessible via the port 146. A housing 150 attached to bay 132 provides a housing for a movable security bar to be discussed below in greater detail. Also, a lock plunger port 152 is provided in the media bay 132 adjacent the housing 150.

In FIGS. 2, 4a and 4b, the security fastener 148 is accessed via security port 146. A tool (not shown) is used to advance the fastener 148 toward latch 140 and retain the latch 140 in the lock position L. The tool is used to back off the fastener 148 away from latch 140 to the unlock position U.

An L-shaped security bar 154, FIGS. 4a and 4b, is provided for movement in housing 150 of bay 132 for movement between a first position O, FIG. 4a, and a second position C, FIG. 4b. In the first position O, a first portion 154a of the security bar opens the security port 146 to expose and provide access to the security fastener 148. In the second position C, the first portion 154a of the security bar closes the security port 146 and conceals the security fastener 148. A second portion 154b, of the security bar 154 is substantially at a right angle relative to the first portion 154a. The second portion 154b is engaged with a resilient device 156 provided with a spring 158 which urges the resilient device 156 in a direction H toward the lock plunger port 152. The result is that the security bar 154 is normally urged to the first position O, FIG. 4a. A well-known security locking device, such as a Kensington lock 160, FIGS. 4a and 4b, includes a lock barrel 162 for insertion of a removable key 161 and a T-shaped lock plunger 164 which rotates when the above-mentioned key 161 is rotated. Thus, rotation of the lock plunger 164 to a position I, FIG. 4a, permits insertion of plunger 164 into the lock plunger port 152. Upon insertion, plunger 164 is advanced against the force of spring 158 of locking device 156. The locking device urges the second portion 154b of the security bar 154 from position O, FIG. 4a, to position C, FIG. 4b, thus causing the first portion 154a to close the security port 146 and block access to the security fastener 148. Rotation of the key 161 rotates the plunger 164 to a position S, thus securing the plunger 164 in bay 132 and retaining the security bar 154 in position C. Removal of the lock 160 is accomplished by insertion and rotation of key 161 to position I for removal from port 152. Thus, the movement of the security bar 154 to position C, restricts access to fastener 148 and therefore, latch 140 can not be moved to the unlock position U as discussed above and illustrated in FIG. 2.

The securing bar 154 of FIGS. 4a and 4b are depicted in a media bay 132, however, the security bar 154 and other features are capable of incorporation into a laptop chassis 232, FIGS. 5a and 5b. An L-shaped security bar 254 is provided for movement in a housing 250 between a first position O, FIG. 5a and a second position C, FIG. 5b. In the first position O, a first portion 254a of the security bar opens a security port 246 to expose and provide access to a security fastener 248. In the second position C, the first portion 254a of the security bar closes the security port 246 and conceals the security fastener 248. A second portion 254b of the security bar is substantially at a right angle relative to the first portion 254a. The second portion 254b is engaged with a resilient device 256 provided with a spring 258 which urges the resilient device 256 in a direction H toward a lock plunger port 252. The result is that the security bar 254 is normally urged to the first position O, FIG. 5a.

A well-known security locking device, such as a Kensington lock 260, FIGS. 5a and 6b operates in the same manner as described above as described for FIGS. 4a and 4b for securing a media module latch 140 in a locked position.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A media apparatus comprising:
a media bay including a media module slot;
a security port formed in the media bay adjacent the media module slot;
a security fastener in the media bay accessible via the security port;
a security bar moveable between a first position wherein a first portion of the security bar opens the security port and exposes the security fastener, and a second position wherein the first portion closes the security port and conceals the security fastener; and
a lock plunger port in the media bay adjacent a second portion of the security bar.

2. The apparatus of claim 1 wherein the security bar is resiliently biased to the first position.

3. The apparatus of claim 1, further comprising:
a resilient member engaging the first portion of the security bar.

4. The apparatus of claim 1 further comprising:
a locking device extending into the lock plunger port.

5. The apparatus of claim 4 wherein the locking device is a Kensington lock.

6. The apparatus of claim 4 wherein the locking device engages the security bar.

7. The apparatus of claim 1 further comprising:
a media module in the media module slot.

8. The apparatus of claim 1 wherein the media bay is coupled to a portable information handling system (IHS).

9. The apparatus of claim 7 wherein the media module is a hard drive.

10. The apparatus of claim 7 wherein the media module is a DVD.

11. The apparatus of claim 7 wherein the media module is an optical device.

12. The apparatus of claim 8 further comprising:
an external media bay coupled to the IHS.

13. A security apparatus comprising:
a media bay;
a media module mounted in the media bay, the media module including a release latch movable between a secured position and a release position, the release latch including a security fastener aperture;
a security port formed in the media bay adjacent the security fastener aperture;
a security fastener in the security fastener aperture retaining the release latch in the secured position;

a security bar movable between a first position opening the security port and a second position closing the security port;

a lock plunger port in the media bay adjacent the security bar; and a lock having a plunger extending into the lock plunger port and into engagement with security bar, the lock plunger being movable to a lock position to urge the security bar from the first position to the second position, and being movable to an unlock position to return the security bar from the second position to the first position.

14. A method of securing a media module comprising:

providing a media bay having a media module slot;

mounting a media module in the slot, the media module including a release latch movable between a secured position and a release position, the release latch including a security fastener aperture;

moving the release latch to the secured position;

fastening a security fastener in the security fastener aperture via a security port formed in the media bay;

providing a security bar in the media bay, the security bar having a first portion adjacent the security port and a second portion adjacent a lock plunger port, the security bar being movable between a first position opening the security port and a second position closing the security port; and actuating a lock plunger to a lock position for extending the lock plunger into the lock plunger port and into engagement with the second portion of the security bar for urging the first portion of the security bar to the second position for closing the security port.

15. The method of claim 14 wherein the media bay is in a portable information handling system (IHS).

16. The method of claim 15 further comprising:

coupling an external media bay to the IHS.

17. An information handling system (IHS) comprising:

a chassis;

a processor mounted in the chassis;

a memory coupled to the processor;

a housing attached to the chassis;

a media module latch movable in the chassis;

a security bar movable in the housing between a first position opening a security port and exposing a security fastener, and a second position closing the security port and concealing the security fastener, whereby the security fastener is movable into and out of engagement with the latch; and a lock plunger port in the chassis adjacent the security bar, whereby the security bar is activated for movement via the lock plunger port.

18. The IHS of claim 17 further comprising:

a locking device extending into the lock plunger port.

19. The IHS of claim 18 wherein the locking device is a Kensington lock.

20. The IHS of claim 17 wherein the media module latch is in a portable IHS.

21. The IHS of claim 17 further comprising:

an external media bay coupled to the IHS.

* * * * *